United States Patent [19]

Howeth

[11] Patent Number: 4,690,166

[45] Date of Patent: Sep. 1, 1987

[54] PRESSURE DEPENDENT DUST CONTROL FILTER COMPRESSED AIR REVERSED FLUSHING CONTROL SYSTEM

[76] Inventor: D. Franklin Howeth, 233 Chuck Wagon Trail, Fort Worth, Tex. 76108

[21] Appl. No.: 757,010

[22] Filed: Jul. 19, 1985

[51] Int. Cl.⁴ .............................................. B01D 46/04
[52] U.S. Cl. ..................................... 137/119; 55/273; 137/624.14; 137/624.18
[58] Field of Search ................... 55/284, 273; 137/119, 137/624.14, 624.18; 251/230; 417/441

[56] References Cited

U.S. PATENT DOCUMENTS

| | | | |
|---|---|---|---|
| 1,191,774 | 7/1916 | Douglass | 417/441 X |
| 2,788,170 | 4/1957 | Kato | 417/441 X |
| 3,332,217 | 7/1967 | Rymer | 137/119 X |
| 3,521,430 | 7/1970 | Vanderlip | 55/284 X |
| 3,540,193 | 11/1970 | Pausch | 55/273 |
| 4,447,193 | 5/1984 | Bunn | 417/441 |
| 4,465,497 | 8/1984 | Howeth | 55/273 |

*Primary Examiner*—Robert G. Nilson

*Attorney, Agent, or Firm*—Hubbard, Thurman, Turner & Tucker

[57] ABSTRACT

Disclosed are a compressed air reversed flushing system and sequencing valve. The flushing system includes a compressed air reservoir that is supplied with compressed air by an air compressor. The system includes a plurality of flushing valves connected to the reservoir. The flushing valves are adapted to open sequentially at a selected reservoir pressure. The volume rate production of the compressor is adjustable so as to control the lapse time between flushing events. The sequencing valve includes a valve body having a cylindrical bore. A piston is slidingly disposed in the bore to divide the bore into first and second chambers. An inlet supplies fluid pressure to the first chamber to act on the piston and drive it toward the second chamber. A plurality of inlets to the second chamber receive pressure from the flushing valves. Each second chamber inlet is provided with a valve. The piston includes an operator pin that is operable to open one of the second chamber valves. Axial movement of the piston in the bore results in stepwise rotation of the piston, which in turn causes the operator pin to open the second chamber inlet valves sequentially.

12 Claims, 2 Drawing Figures

PRESSURE DEPENDENT DUST CONTROL FILTER COMPRESSED AIR REVERSED FLUSHING CONTROL SYSTEM

BACKGROUND OF THE INVENTION

A. Field of the Invention

The present invention relates generally to dust control filter systems, and more particularly to a control system for flushing sequentially plural filters, wherein the sequence time between flushing events is dependent upon the volume rate production of the fluid compressor and in which the sequence time may be varied by adjusting the volume rate of the fluid compressor and thus its fluid flow discharge volume.

B. Description of the Prior Art

The elimination of excess amounts of airborne dust in the workplace or in the environment has prompted increased demand upon manufacturers of surface cleaning maintenance equipment to produce equipment capable of cleaning severly contaminated surface areas. Severe dust problems are encountered in such industrial operations as cement production, foundries, dry granular chemical production, and dry granular food production. The operations of such industries generate a great deal of airborne particulate that eventually settles on the surfaces of the facility. Health and environmental considerations dictate that the surfaces must be cleaned.

Mobile rotary broom sweepers of less than about 40 horsepower have been developed for cleaning industrial facilities. Such sweepers utilize a dust and debris collecting hopper as a collecting reservoir for material swept from the contaminated surface by the broom. My co-pending U.S. patent application Ser. No. 680,942, filed Dec. 12, 1984, now Pat. No. 4,637,825, discloses a self-cleaning air filter system used in conjunction with an induced draft fan within the hopper of a mobile sweeper to control the dust during sweeping operations. The system of my co-pending application requires an air compressor providing a continuous reservoir of high pressure air, i.e. about 80 psi, to supply a filter reverse flushing cleaning system. The flushing system includes a flushing air reservoir with flushing valves in conjunction with a combined flushing control and flushing control actuator system with flushing pressure and lapse rate control such as those disclosed in my U.S. Pat. No. 4,465,497.

The application of such a sophisticated compressed air filter flushing system to rotary broom sweepers of such low horsepower and small size relative to the larger "street sweeper" class of vehicles adds to marketplace resistance relative to investment costs, operating costs, and maintenance costs. The potential of this resistance can be appreciated when one realizes the next lower level of technology for cleaning such facilities requires the investment and upkeep of a broom, shovel, and refuse barrel. The resistance to equipment cost is amply clear when one considers that it is common in the marketplace to utilize contract sweeping firms as a matter of economics relative to meeting environmental cleaning standards.

The utilization of sweepers in contract sweeping and the broad number of applications for these machines and the additional numbers of machines going into a broad range of single job severe environment applications necessitates a filter cleaning system of flexible capabilities relative to the task. Additionally, the economic resistance necessitates technology representing low initial costs, and low operating and maintenance costs.

The ability of a porous barrier filter system to gather dust is related to sustaining air flow through the filter media. Resistance to air flow through the media and the collected dust cake is generally expressed as the pressure drop across the filter media. Theoretically, the pressure drop is equal to the approach velocity to the filter media multiplied by the absolute viscosity of the conveying air stream multiplied by the mass of the dust cake divided by the permiability of the dust. Accordingly, for a given flow rate, resistance to flow increases relative to the mass of the dust cake and the time required to build the maximum desired or tolerated resistance is directly proportional to a given dust and its level of concentration. It is therefore important to select a reverse flushing cleaning frequency appropriate to sustain collecting efficiency for a given dust and its concentration.

Additionally, in a reverse flushing air filtration system, the ability of the flushing system to remove the dust cake from the face of the media is relative to the pressure potential of the air supplying the reverse flushing air blast and dwell period of the blast. The pressure requirements are relative to air reservoir volume, flushing air discharge nozzle size, and filter media area and through put air flow velocities. Presently available systems use air pressures ranging from 8 to 100 psig. The dwell period for the reverse flushing air blast is generally from 100 to 200 milliseconds with some controls allowing up to 500 milliseconds.

Typical reverse flushing systems include a common high pressure air storage reservoir supplying high volume flow to a series of quick opening filter flushing valves. Various controls have been devised to assure adequate filling of the flushing air storage reservoir and subsequent cyclic release of the compressed air through the flushing valves. Typically, the cyclic filter flushing event is controlled by a system which includes either an electrical timing control and separate means for controlling flushing air pressure or fluidic or air/mechanical systems that are energized by the flushing air source to control both time and pressure. The fluidic and air/mechanical systems generally utilize the reservoir fill time to control lapse time and pressure. The reservoir fill time is controlled by:

a. air from a volume/pressure source flowing through a fixed or variable orifice to the flushing air storage reservoir;

b. air from a volume/pressure source flowing through a pressure regulator to a flushing air storage reservoir; or, c. air from a volume/pressure source flowing directly to the flushing air storage reservoir.

In addition to cost, a disadvantage of the systems of the prior art lies in their compressor requirements. All of the prior art systems have substantially more compressor capacity than is necessary for filter flushing. For example, in systems in which the air from the compressor flows through a fixed or variable orifice to the flushing air storage reservoir, the compressor at all times must operate against a back pressure at least as great as produced by the loss across the orifice. Accordingly, in such systems, compressor energy requirements and maintenance costs are high. Additionally, the prior art systems produce more compressed air than is actually necessary in order to provide sufficient flushing volume. The additional air is either stored in an auxiliary reservoir or vented. In either case, the additinal work and compressor capacity used in providing excess compressed air is or may be wasted. Examples of prior art flushing systems are disclosed in the following U.S. Pat. Nos. 2,980,207; 3,066,688; 3,332,217; 3,521,430; 3,735,566; 4,388,087; and, 4,465,497.

It is therefore an object of the present invention to provide a filter flushing control system that overcomes the shortcomings of the prior art. More specifically, it is an object of the present invention to provide a simplified filter flushing lapse time and pressure control system which provides the sophistication of variable lapse time and variable flushing pressure by varying the rate of air compressor discharge flow volume such that the time required after each flushing event to refill the flushing air reservoir to the flushing pressure is equal to the required lapse time for optimum filter efficiency. It is a further object of the present invention to provide an improved pressure operated sequencing device.

SUMMARY OF THE INVENTION

The foregoing and other objects are accomplished by the system of the present invention. The system includes a fixed volume compressed air reservoir. The reservoir is supplied with compressed air by a compressor and the system includes means for adjusting the volume rate production of the air compressor and thus its air flow discharge volume. A plurality of flushing valves are connected to the reservoir and means are provided for opening a selected one of the flushing valves when the pressure in the reservoir reaches the selected flushing pressure.

In one embodiment of the invention, the volume rate production of the air compressor and thus its air flow discharge volume is varied by means of a variable orifice at the compressor inlet. Such embodiment is particularly useful with a constant speed compressor. The volume rate production, and thus discharge volume, may be varied from substantially zero to the rated capacity of the compressor by adjusting the size of the orifice. At all times, the back pressure at the compressor outlet is equal to reservoir pressure. Thus, immediately after each flushing event, when the reservoir is substantially exhausted and reservoir pressure is near atmospheric, the compressor works against a relatively low back pressure. The back pressure at discharge increases gradually throughout the full cycle until flushing pressure is reached.

In an alternative embodiment of the system of the present invention, the volume rate production of the air compressor and thus its air flow discharge volume is varied by maintaining constant the orifice at the compressor inlet and varying the compressor drive speed. In either embodiment, the flushing lapse time at any particular flushing pressure is set by adjusting the volume rate production of the air compressor.

The flushing valves of the system of the present invention are open by the combination of control valve and a sequencing valve. The control valve is adapted to sense reservoir pressure and open at the selected flushing pressure. The sequencing valve is connected to the control valve and is adapted to sequentially open the flushing valves.

The preferred sequencing valve of the present invention includes a valve body having a cylindrical bore with a piston slidingly mounted therein. The piston divides the bore into a first chamber and a second chamber. An inlet is provided in the first chamber for receiving air from the control vavle and an outlet is provided for discharging air from the first chamber. Means are provided for urging the piston axially toward the first chamber.

The second chamber is provided with a plurality of inlets, with each of the inlets being connected to one of the flushing valves. A normally, closed poppet valve is included in each inlet of the second chamber. A vent is provided for venting the second chamber.

The piston is arranged to rotate in stepwise or incremental fashion in response to its axial movement in the valve body bore. The piston includes an operator that is adapted to engage and open a selected one of the valves in the second chamber in response to air received from the control valve at the first chamber inlet.

DESCRIPTION OF THE PREFERRED EMBODIMENT

Figure 1:
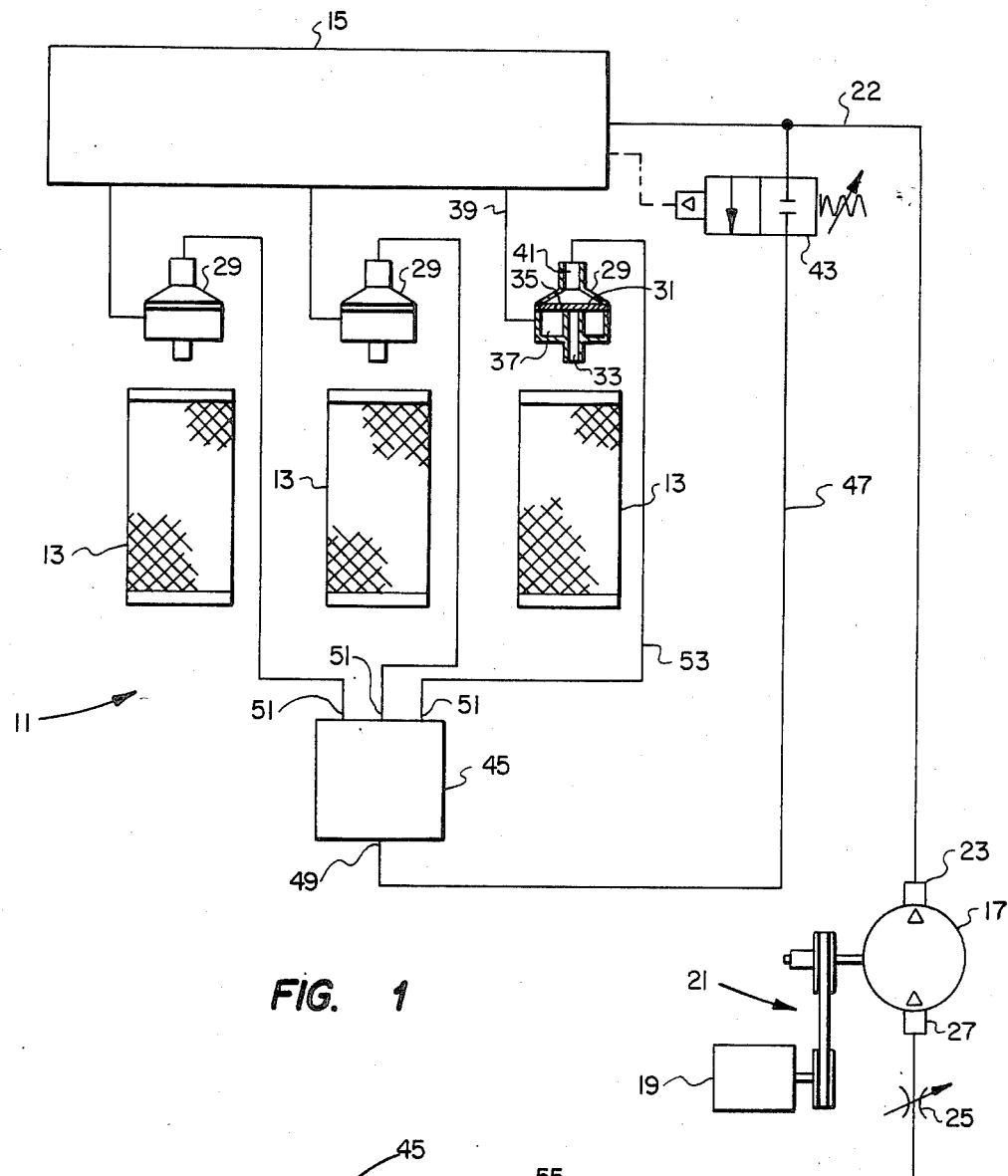
FIG. 1 is a schematic view of the flushing system of the present invention.

Referring now to the drawing, and first to FIG. 1, the compressed air reverse flushing system of the present invention is designated generally by the numeral 11. System 11 is adapted to provide reverse flow flushing air to a filtration system which includes a plurality of filter elements 13. The filter elements may be separate cylindrical pleated paper filter elements, or may be separate compartments of a segmented bore-type filter element. In either event, system 11 is adapted to flush sequentially a plurality of filter elements. While three filter elements 13 are illustrated, those skilled in the art will appreciate that the system of the present invention may be used in connection with more or fewer filter elements.

System 11 includes a fixed volume compressed air reservoir 15. Reservoir 15 has a capacity sufficient to provide air in sufficient quantities and pressure to flush effectively each filter element 13.

Reservoir 15 is supplied with compressed air through a conduit 22 from a compressor 17. Compressor 17 is driven by a motor 19 through an appropriate transmission system 21. System 11 is particularly useful in a mobile rotary broom apparatus in which motor 19 runs at a constant speed and provides power for both compressor 17 and the rotary broom (not shown).

In the preferred embodiment, the volume rate production of air for discharge at the outlet 23 of compressor 17 is adjusted by means of a variable orifice 25 at inlet 27 of compressor 17. Variable orifice 25 is preferably a valve having a flow way that is continuously variable between a fully closed position and a fully open position. At the fully open position, the rate of compressor discharge volume at outlet 23 is substantially equal to the rated volume capacity of compressor 17 at whatever speed it is being driven.

System 11 includes a plurality of quick opening pneumatically actuated flushing valves 29. Preferably, each flushing valve includes a flexible diaphragm closure member 31 that is operable to close over a discharge passage when the fluid pressure on opposite sides of diaphragm 56 is substantially equal. A small orifice 35 is provided in diaphragm 56 to interconnect opposed fluid chambers within the interior of flushing valve 29. A main fluid chamber 37 is charged with flushing air from reservoir 15 through a conduit 39. A pilot chamber 41 receives air from main chamber 37 through orifice 35.

Flushing valves 29 are operated to flush filters 13 by means of a control system which includes a control valve 43 and a sequencing valve 45. Control valve 43 is normally closed and is operated to move to the open position in response to pressure in reservoir 15. The pressure at which control valve 43 shifts to the open position is variable so that control valve 43 may be set to open at the selected flushing pressure. Control valve 43 is connected to receive pressure from conduit 22 and supply pressure to sequencing valve 45 through conduit 47.

Sequencing valve 45 includes an inlet 49 connected to conduit 47 to receive pressure from control valve 43. Sequencing valve 45 also includes a plurality of inlets 51 which are connected to receive pressure from pilot chamber 41 of flushing valve 29 through a conduit 53.

Figure 2:
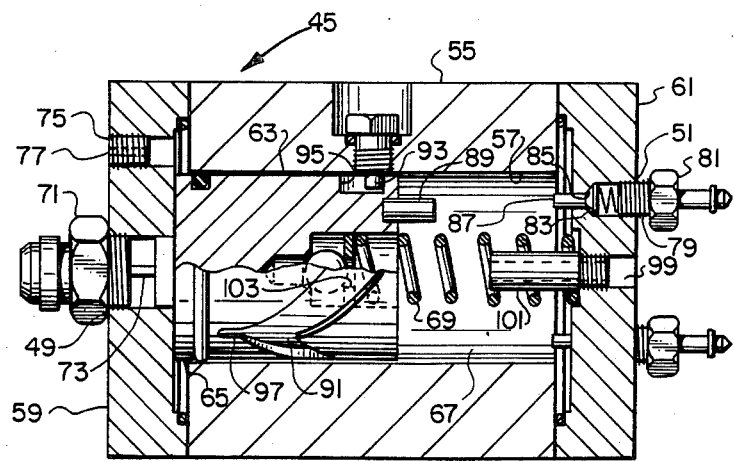
FIG. 2 is a partial sectional view of the sequencing valve of the present invention.

Referring now to FIG. 2, sequencing valve 45 includes a valve body 55 having a cylindrical bore 57. Bore 57 is enclosed at one end by a first closure plate 59 and at the other end by a second closure plate 61. Closure plates 59 and 61 are secured to valve body 55 by suitable means, as for example screws (not shown). A piston 63 is slidingly sealingly mounted within bore 57. Piston 63 divides bore 57 into a first chamber 65 and a second chamber 67. Piston 63 is normally biased toward first chamber 65 by a spring 69. Inlet 49 is formed by a fitting 71 threadedly engaged with first closure plate 59. Pressure from control valve 43 enters first chamber 65 through inlet 49 and acts to move piston 63 toward second chamber 67 against the force of spring 69. An orifice 73 is provided in inlet 49 to cushion the flow of air into first chamber 65 so as to cause piston 63 to move smoothly in the direction of second chamber 67. An outlet 75 is formed in first closure plate 59 and includes a flow restriction exhaust orifice 77. Exhaust orifice 77 has a flow area smaller than that of orifice 73 of inlet 49. Exhaust orifice 77 contributes to the cushioning of the movement of piston 63 when pressure is received from control valve 43 and allows piston 63 to return to its normal position when pressure from control valve 43 is terminated.

Inlets 51 are formed in second closure plate 61 and are substantially equiangularly spaced apart about the center of bore 57. Each inlet 51 includes a spring loaded poppet valve 79, which includes a hose fitting 81 threadedly engaged with second closure plate 61 and a valving member 83. Valving member 83 is normally urged into sealing engagement with a seat 85 and includes a valve operator 87 which extends into second chamber 67.

The poppet valves 79 are opened by an operator pin 89 which extends outwardly from piston 63 into second chamber 67. Piston 63 is caused to rotate in stepwise fashion by a cam slot 91 formed about piston 63, which cooperates with a cam pin 92 engaged with valve body 55. Cam slot 91 includes alternating oppositely directed helical portions. When piston 63 is moved under the influence of air pressure toward second chamber 67, cam pin 93 coacts with edge 95 of cam slot 91 to rotate piston 63. Cam slot 91 includes an axially extending end portion 97 which allows piston 63 to move axially near the end of its movement toward chamber 67, at which time operator pin 89 engages a valve operator 87 to open one of the poppet valves 79. The opening of poppet valve 79 causes pilot chamber 41 of one of the flushing valves 29 to exhaust, thereby to open that flushing valve 29 to flush filter element 13. A vent 99 is formed in second closure plate 61 to exhaust air received in second chamber 67 through valves 79 and to compensate for pressure changes as piston 63 moves back and forth. A cylindrical stop member 101 is threadedly engaged with second closure plate 61 at vent 99. Stop 101 serves partially to support spring 69 and cooperates with a washer 103 supported in piston 63 to limit movement of piston 63 toward second chamber 67.

In operation, the flushing pressure and flushing lapse time are selected appropriate to the system and dust conditions encountered. The flushing pressure is set by adjusting control valve 43 to open at the appropriate pressure. The lapse time is set by adjusting variable orifice 25 such that the time required for the pressure in reservoir 15 to reach flushing pressure is equal to the appropriate lapse time. Alternatively, the speed at which compressor 17 is driven by motor 19 may be adjusted, thereby to vary the volume rate production of compressor 17 and thus the rate of compressed air discharge volume.

When the pressure in reservoir 15 reaches the appropriate flushing pressure, control valve 43 opens and admits pressure through conduit 47 to inlet 49 of sequencing valve 45. The pressure at inlet 49 causes piston 63 to move axially toward second chamber 67 of sequencing valve 55, whereby operator pin 89 opens one of the poppet valves 79 in inlet 51. The opening of poppet valve 79 causes an associated flushing valve 29 to open and flush a filter element 13. Flushing valve 29 remains open until reservoir 15 is substantially exhausted whereupon flushing valve 29 closes and reservoir 15 refills. The refill time of reservoir 15 is equal, again, to the selected lapse time. When reservoir 15 refills, the foregoing sequence is repeated and the next sequential filter element 13 is flushed.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size, and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. A sequencing valve for sequentially opening a plurality of flushing valves of compressed fluid flushing system, which comprises:

a valve body having a cylindrical bore;
a piston slidingly mounted in said bore and dividing said bore into a first chamber and a second chamber;
an inlet to said first chamber;
an outlet for discharging air from said first chamber;
a plurality of inlets to said second chamber;
a normally closed valve in each of said inlets to said second chamber;
means for venting said second chamber;

operator means on said piston for opening one of said valves in said inlets to said second chamber;

means for biasing said piston toward said first chamber;

and means for rotating said piston in response to axial movement of said piston within said bore, whereby said operator means sequentially opens said valves in said inlets to said second chamber in response to fluid pressure received at said inlet to said first chamber.

2. The system as claimed in claim 1, including:

a flow restriction orifice in said inlet to said first chamber;

and a flow restriction orifice in said outlet from said first chamber, said flow restriction orifice in said outlet from said first chamber having a flow area smaller than that of the flow restriction orifice in said inlet to said first chamber.

3. The system as claimed in claim 1, wherein said means for rotating said piston includes:

a cam slot formed about the circumference of said piston, said cam slot including a plurality of alternating helical portions;

and a cam pin connected to said valve body and in camming engagement with said cam slot.

4. The system as claimed in claim 1, wherein said inlets to said second chamber are disposed substantially equiangularly spaced apart about the center of an end of said bore, and said operator means includes a pin on an end of said piston, said pin being engageable with one of said valves in said inlets to said second chamber when said piston is moved toward said second chamber.

5. A compressed fluid flushing system, which comprises:

a compressed fluid reservoir;

a fluid compressor having an outlet connected to supply compressed fluid to said reservoir;

means for regulating the volume rate of compressed fluid produced by the compressor for discharge at said compressor outlet;

a plurality of flushing valve connected to receive compressed fluid from said reservoir, each of said flushing valves including a pilot chamber and main chamber separated from said pilot chamber by diaphragm valve means for releasing pressure in said main chamber in response to a drop in pressure in said pilot chamber;

a control valve adapted to sense fluid pressure in said reservoir and open at said selected pressure;

and a sequencing valve having a first inlet connected to receive pressure from said control valve, and a plurality of second inlets connected to receive pressure from said pilot chambers, said sequencing valve including piston means operable in response to pressure received at said first inlet for releasing pressure at a selected one of said second inlets thereby to operate a selected one of said flushing valves, said sequencing valve including means for indexing said piston to release pressure at a second selected one of said inlets.

6. The system as claimed in claim 5, wherein said compressor discharge volume rate production regulating means includes means for varying the speed at which said compressor is driven.

7. The system as claimed in claim 5, wherein said compressor discharge volume rate production regulating means includes means for controlling the amount of fluid available at the inlet of said compressor.

8. The system as claimed in claim 7, wherein said means for controlling the amount of fluid available at the compressor inlet includes variable orifice valve means at said compressor inlet.

9. The system as claimed in claim 18, wherein said sequencing valve includes:

a valve body having a cylindrical bore;

said piston means including a piston slidingly mounted in said bore and dividing said bore into a first chamber and a second chamber;

said first inlet being connected to said first chamber;

an outlet for discharging air from said first chamber;

said plurality of second inlets being connected to said second chamber;

a normally closed valve in each of said second inlets;

means for venting said second chamber;

said piston means including operator means on said piston for opening one of said valves in said second inlets;

means for biasing said piston toward said first chamber;

and said indexing means includes means for rotating said piston in response to axial movement of said piston within said bore, whereby said operator means sequentially opens said valves in said second inlets in response to fluid pressure received at said first inlet.

10. The system as claimed in claim 9, including:

a flow restriction orifice in said first inlet;

and a flow restriction orifice in said outlet from said first chamber, said flow restriction orifice in said outlet from said first chamber having a flow area smaller than that of the flow restriction orifice in said first inlet.

11. The system as claimed in claim 7, wherein said means for rotating said piston includes:

a cam slot formed about the circumference of said piston, said cam slot including a plurality of alternating helical portions;

and a cam pin connected to said valve body and in camming engagement with said cam slot.

12. The system as claimed in claim 9, wherein said second inlets are disposed substantially equiangularly spaced apart about the center of an end of said bore, and said operator means includes a pin on an end of said piston, said pin being engageable with one of said valves in said second inlets when said piston is moved toward said second chamber.

* * * * *